United States Patent
Wang et al.

(10) Patent No.: US 9,137,501 B2
(45) Date of Patent: Sep. 15, 2015

(54) METHOD AND SYSTEM FOR COMMUNICATING BETWEEN A HOST DEVICE AND USER DEVICE THROUGH AN INTERMEDIATE DEVICE USING SYNTAX TRANSLATION

(75) Inventors: Phillip T. Wang, Rockville, MD (US); Sean S. Lee, Potomac, MD (US); Scott D. Casavant, Germantown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 225 days.

(21) Appl. No.: 13/612,389

(22) Filed: Sep. 12, 2012

(65) Prior Publication Data

US 2014/0075486 A1    Mar. 13, 2014

(51) Int. Cl.
*H04N 7/20* (2006.01)
*H04L 29/06* (2006.01)
(Continued)

(52) U.S. Cl.
CPC .. *H04N 7/20* (2013.01); *G06F 9/00* (2013.01); *H04L 65/608* (2013.01); *H04L 67/2823* (2013.01); *H04L 67/303* (2013.01); *H04L 69/08* (2013.01); *H04L 67/28* (2013.01)

(58) Field of Classification Search
CPC .............. H04L 29/06; H04L 29/08072; H04L 29/08756; H04L 29/0809; H04L 29/06068; H04L 29/08981; H04L 29/08117; H04L 7/00; H04L 61/00; H04L 61/6077; H04L 61/6086; H04L 65/00–65/1003; H04L 65/105; H04L 65/1066–65/1073; H04L 65/60; H04L 65/601; H04L 65/605; H04L 65/608; H04L 67/00–67/025; H04L 67/28; H04L 67/2823; H04L 67/303; H04L 69/00; H04L 69/08; H04L 69/18; G06Q 10/10; G06Q 30/02; G06F 17/3089; H04N 1/00; H04N 1/00127; H04N 1/00204; H04N 1/0035; H04N 1/00405; H04N 1/00408; H04N 7/01; H04N 7/20; H04N 21/20; H04N 21/222; H04N 21/23
USPC ................. 709/246–247, 250, 231, 217–219, 709/201–206, 230; 725/37, 38, 63, 68, 135, 725/139, 143, 149
See application file for complete search history.

(56) References Cited

U.S. PATENT DOCUMENTS 6,064,420 A    5/2000 Harrison et al.
6,247,048 B1 *  6/2001 Greer et al. ................... 709/219
(Continued)

FOREIGN PATENT DOCUMENTS

WO    2007/092953 A2    8/2007
WO    2009/008578 A1    1/2009
WO    WO 2009137498 A1 * 11/2009 ............. H04N 7/173

OTHER PUBLICATIONS

International Search Report and Written Opinion dated Oct. 24, 2013 in International Application No. PCT/US2013/058493 filed Sep. 6, 2013 by Phillip T. Wang et al.
(Continued)

*Primary Examiner* — Brian J Gillis
*Assistant Examiner* — Boris Grijalva Lobos

(57) ABSTRACT

A system and method includes a host device, an intermediate device and a user device having a device type associated therewith. A network is in communication with the host device, the intermediate device and the user device. The host device communicates a first graphics command to the intermediate device. The intermediate device converts the first graphics command to a second graphics command in response to the device type. The user device generates a screen display in response to the second graphics command.

21 Claims, 12 Drawing Sheets

(51) Int. Cl.
*G06F 9/00* (2006.01)
*H04L 29/08* (2006.01)

(56) References Cited

U.S. PATENT DOCUMENTS

| | | | |
|---|---|---|---|
| 6,253,326 B1* | 6/2001 | Lincke et al. | 726/12 |
| 6,345,307 B1* | 2/2002 | Booth | 709/247 |
| 7,970,857 B2* | 6/2011 | Schneider | 709/217 |
| 8,219,699 B2* | 7/2012 | Lange et al. | 709/230 |
| 8,681,203 B1* | 3/2014 | Yin et al. | 348/14.08 |
| 2002/0171765 A1 | 11/2002 | Waki et al. | |
| 2002/0188956 A1* | 12/2002 | Ficco et al. | 725/110 |
| 2002/0199199 A1 | 12/2002 | Rodriguez | |
| 2005/0076361 A1 | 4/2005 | Choi et al. | |
| 2006/0149746 A1* | 7/2006 | Bansod et al. | 707/10 |
| 2006/0227141 A1 | 10/2006 | Hogle | |
| 2007/0006250 A1* | 1/2007 | Croy et al. | 725/9 |
| 2007/0165043 A1* | 7/2007 | Fouladi et al. | 345/558 |
| 2008/0107133 A1* | 5/2008 | Lee | 370/477 |
| 2008/0281798 A1* | 11/2008 | Chatterjee et al. | 707/3 |
| 2008/0313291 A1* | 12/2008 | Kazmi | 709/206 |
| 2009/0059909 A1* | 3/2009 | Sullivan | 370/360 |
| 2009/0182844 A1* | 7/2009 | Barton et al. | 709/219 |
| 2009/0189894 A1 | 7/2009 | Petrov et al. | |
| 2009/0234971 A1* | 9/2009 | Jethanandani et al. | 709/246 |
| 2009/0305789 A1* | 12/2009 | Patil | 463/42 |
| 2010/0281537 A1* | 11/2010 | Wang et al. | 726/22 |
| 2010/0299701 A1* | 11/2010 | Liu et al. | 725/39 |
| 2011/0029593 A1* | 2/2011 | Howard et al. | 709/203 |
| 2011/0145593 A1* | 6/2011 | Auradkar et al. | 713/189 |
| 2011/0175923 A1* | 7/2011 | Mahajan et al. | 345/522 |
| 2011/0208838 A1* | 8/2011 | Thomas et al. | 709/219 |
| 2011/0302499 A1* | 12/2011 | Chou et al. | 715/738 |
| 2012/0075531 A1* | 3/2012 | Carroll et al. | 348/584 |
| 2012/0117145 A1* | 5/2012 | Clift et al. | 709/203 |
| 2012/0127516 A1* | 5/2012 | Chen et al. | 358/1.15 |
| 2012/0131139 A1* | 5/2012 | Siripurapu et al. | 709/217 |
| 2012/0158472 A1* | 6/2012 | Singh et al. | 705/14.4 |
| 2012/0192230 A1* | 7/2012 | Algie et al. | 725/38 |
| 2012/0254450 A1 | 10/2012 | Lejeune et al. | |
| 2012/0278504 A1* | 11/2012 | Ang et al. | 709/246 |

OTHER PUBLICATIONS

Shapiro, Edmond; "Architecting the Media Gateway for the Cable Home"; NDS Technical Paper; 2011; pp. 1-17.

* cited by examiner

METHOD AND SYSTEM FOR COMMUNICATING BETWEEN A HOST DEVICE AND USER DEVICE THROUGH AN INTERMEDIATE DEVICE USING SYNTAX TRANSLATION

TECHNICAL FIELD

The present disclosure relates generally to a communication system for communicating content to a user device, and, more specifically, to a method and system for communicating content to the user device through an intermediate device using a composite syntax translation.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box. Because of the numerous components associated with the set top box, the set top box for each individual television is relatively expensive.

Satellite television systems typically broadcast content to a number of users simultaneously in a system. Satellite television systems also offer subscription or pay-per-view access to broadcast content. Access is provided using signals broadcast over the satellite. Once access is provided, the user can access the particular content.

Electronic devices are increasingly accessing the Internet. In the newest flat panel televisions, Internet connections are provided to enhance the customer experience. For example, various Internet sources such as movie sources and data sources such as weather data and stock data may all be obtained directly from the Internet-connected device.

Because each electronic device receives the signals and also processes the signals, the customer experiences at each of the electronic devices may be slightly different. Consistency and the quality that the customer perceives at each device are important for providing a consistent customer experience.

SUMMARY

The present disclosure provides a method and system for intercommunicating between two devices through an intermediate device by changing the syntax of the commands.

In one aspect of the disclosure, a system includes a first device, an intermediate device and a second device. A network is in communication with the first device, the intermediate device and the second device. The first device communicates a command in a first format to the intermediate device. The intermediate device converts the command to a second format. The intermediate device communicates the command in a second format to the second device. The second device then processes the command in the second format.

In a further aspect of the disclosure, a system includes a host device, an intermediate device and a user device having a device type associated therewith. A network is in communication with the host device, the intermediate device and the user device. The host device communicates a first graphics command to the intermediate device. The intermediate device converts the first graphics command to a second graphics command in response to the device type. The user device generates a screen display in response to the second graphics command.

In yet another aspect of the disclosure, a method includes communicating a device type signal from a user device to an intermediate device, communicating a first graphics command from a host device to the intermediate device and converting the first graphics command to a second graphics command in response to the device type signal at the intermediate device and generating a screen display at the user device in response to the second graphics command.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
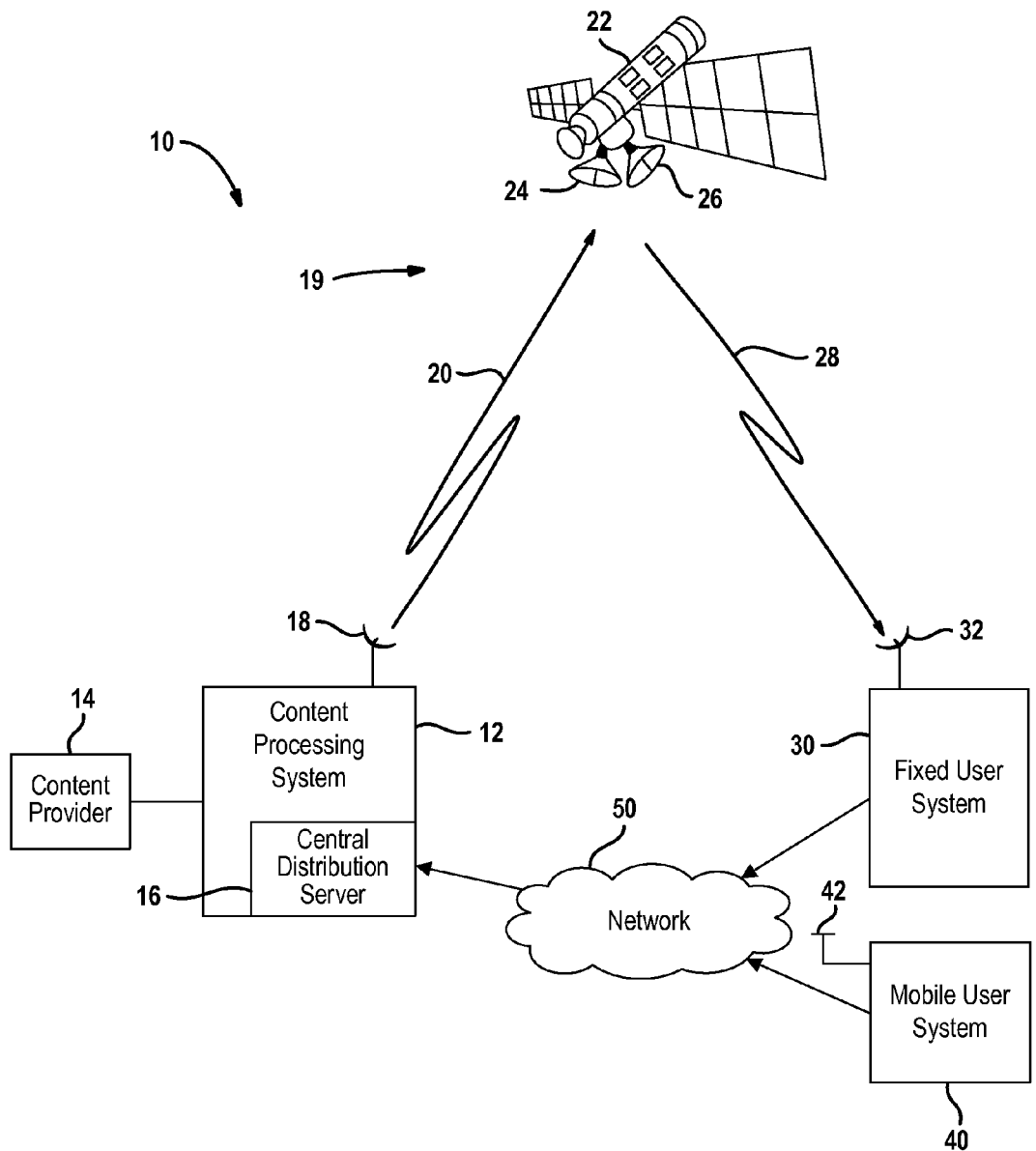
FIG. 1 is a high level block diagrammatic view of a satellite distribution system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

RVU as used herein refers to the RVU protocol. The RVU protocol is a communications protocol that runs on a media server device and multiple client devices. The RVU protocol is an application layer protocol that combines pre-existing Digital Living Network Alliance (DLNA) standards and a remote user interface protocol.

Referring now to FIG. 1, a communication system 10 is illustrated. Communication system 10 includes a content processing system 12 that is used as a processing and transmission source. A plurality of content providers 14, only one of which illustrated, may provide content to the content processing system 12. The content processing system 12 receives various types of content from the content provider 14 and communicates the content to system users. The content processing system 12 may also be associated with a central distribution server 16. The central distribution server 16 may be incorporated into the content processing system 12 or may be a separate item. The central distribution server 16 may be used for various types of distribution functions including providing content, providing control commands such as resetting a user device, providing a software image or providing an updated software image to a user system. Other uses of the central distribution server 16 will be described below.

The content processing system 12 communicates with various user systems through a content delivery system 19. The content delivery system 19 may be one of the various types of systems such as a wired, wireless, Internet Protocols, cable, high frequency system, etc. described above. In this case, a satellite system is illustrated but should not be considered limiting.

Carrying through with the satellite example, the content processing system 12 includes an antenna 18 for communicating processed content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

A fixed user system 30 receives the downlink signals 30 through a receiving antenna 32. The fixed user system 30 is a fixed user system meaning it is stationary. However, some components may be mobile components. The fixed user system 30 may be deployed within a building such as a single-family household, a multi-dwelling unit, or a business. The fixed user system 30 may be a set top box, game console or the television itself which has been modified to communicate through a network. Details of the fixed user system are provided below.

The present disclosure is also applicable to a mobile user system 40. The mobile user system 40 may include a satellite antenna 42. The satellite antenna 42 may be a tracking antenna to account for the mobility of the mobile user system. This is in contrast to the antenna 32 of the fixed user system that may be fixed in a single direction. The mobile user system 40 may include systems in airplanes, trains, buses, ships, and the like.

The fixed user system 30 and the mobile user system 40 may be in communication with a network 50. The network 50 may be a single network or a combination of different networks or different types of networks. Different networks may have different speeds or bit rates. The network 50 may, for example, be a broadband wired network or wireless network. The network 50 may be a one-way network so that data or content may be communicated from the fixed user system 30 or the mobile user system 40 through the network 50 to the content processing system 12 and the central distribution server 16. Likewise, the network 50 may also be one-way in the other direction so that the content distribution server 16 may communicate content data or other control signals such as a reset signal through the network 50 to the fixed user system 30 and the mobile user system 40. The network 50 may also be a two-way network so that communications may take place between the content processing system 12, which includes the distribution server 16, and the fixed user system 30 and the mobile user system 40.

Figure 2:
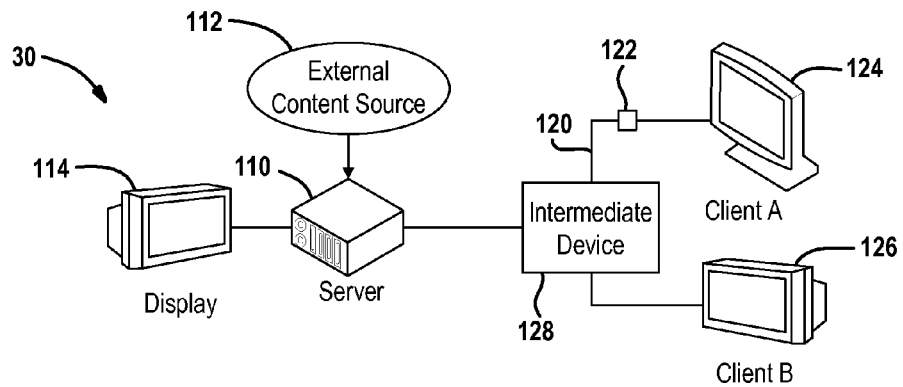
FIG. 2 is a block diagrammatic view of a first network topology.

Referring now to FIG. 2, an example of a fixed user system 30 is illustrated in further detail. The fixed user system 30 may include a local network server 110. The local network server 110 may receive content from an external source 112. The external source 112 may be a satellite distribution system as illustrated in FIG. 1 or the other sources described above. In such a case, the external source 112 may be the satellite antenna 32 illustrated in FIG. 1 and the server 110 may be a satellite television set top box (with server capabilities) receiving satellite television video signals. The external source 112 may be a variety of television signal sources such as an over-the-air tuner, a cable, a wireless system, or an optical system. Various types of signals such as data, music, video, games, audio, and combinations thereof may be part of the external source.

The host or server device 110 may act as a set top box for directly communicating content to a display 114. The content in a direct connection may not be renderable content but rather directly displayable signals within a frequency band. The signals to display 114 may also be renderable. The display 114 may be a television or monitor.

The server 110 may also be in communication with a local area network 120. Although wired connections are illustrated, wireless or optical signals may be used for communicating through the local area network 120. The server device 110 may also communicate with the network 50 illustrated in FIG. 1. In that case, the network 50 is an external network when compared to local area network 120. The local area network of FIG. 2 is formed through the server 110. That is, the server 110 acts to communicate to both clients A and B as well as acts as an intermediary if client A communicates with Client B, or vice versa.

The host or server device 110 may communicate with a first client, Client A, using a client device 122. The server device 110 may stream content signals to the client device 122. The server device 110 may also control the display of content and screen displays or remote user interfaces at the client device. The remote user interface may be a graphical user interface for controlling various selections or controls. The client device 122 may perform various functions that will be described below. For example, the client device 122 may render renderable signals from the server or intermediate device for displaying the rendered signals on a display 124 associated with the client device 122. The client device 122 may also select the content and controls from the user interface and communicate the control signals to the server device 110.

A second client, Client B, may also be in communication with the server 110 through the local area network 120. Client B may contain an internal client device, not shown, for displaying rendered signals on the display 126. The internal client device may be functionally equivalent to the standalone client device 122. Because both the first client, Client A, the second client, Client B and the intermediate device 128 are in communication with the server 110, the network 120 may be referred to as a closed network. Various numbers of clients may be connected to the local area network 120.

An intermediate device 128 may be disposed within the local area network 120. The intermediate device 128 is in communication with the server 110 and at least one of the clients 122, 126. The intermediate device may act as a syntax translator that translates signals in a first syntax into signals in a second syntax. The intermediate device 128 may translate signals from the server 110 to one of the clients 122, 126 or vice versa. The intermediate device 128 may perform syntax translation using a browser server that interacts with XML signals from the client devices. It should be noted that the intermediate device 128 may allow a server that communicates in a first format or syntax to communicate with one of the client devices 122, 126 in a second format or syntax and vice versa. The intermediate device 128 may also be used to perform various functions. The functions will be further described below with respect to the detailed figures of the intermediate device.

Figure 3:
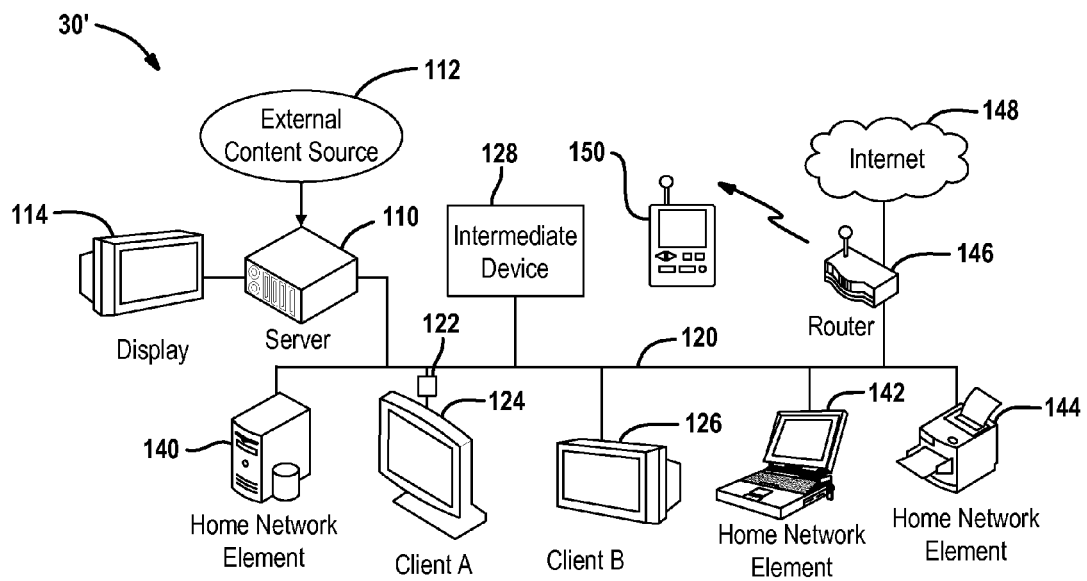
FIG. 3 is a block diagrammatic view of a second example of the network topology.

Referring now to FIG. 3, a user system 30' which is an open network is illustrated. In this example, the same components described above in FIG. 2 are provided with the same reference numerals. In this example, the local area network 120 may include a number of home network elements. One home network element may be a home network server 140 or other computing device. Another home network element may include a laptop computer 142 that is in communication with the local area network 120. Another home network element may include a network printer 144 and a router 146. The router 146 may communicate with other devices through an external network such as the Internet 148.

The fixed user system 30 may also have wireless elements associated therewith. The router 146 or another network device may generate wireless signals that allow a wireless user device 150 to communicate with at least one server 110 or 140. The wireless user device 150 may, for example, be a personal digital assistant, a cellular phone, a personal media device or a Blu-Ray or DVD player. Of course, other wireless devices may be part of the network 120. The wireless user device 150 may also communicate with the local area network 120 through the internet 148 thus the system 30' is not limited to a local system.

Figure 4:
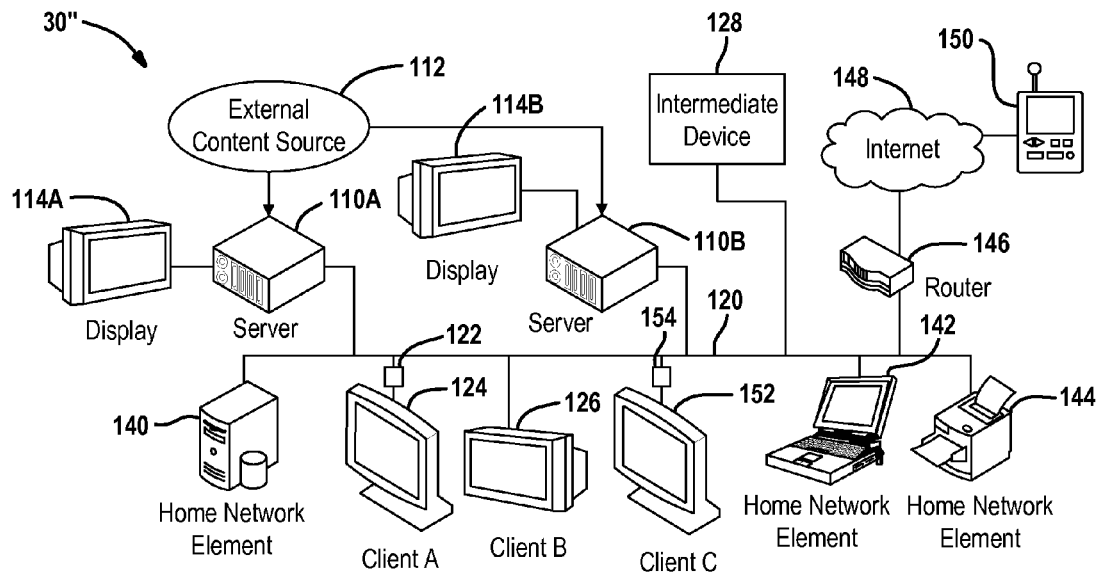
FIG. 4 is a block diagrammatic view of a third example of a network topology.

Referring now to FIG. 4, another example of a user system 30" is illustrated. In this example, the same elements from FIGS. 2 and 3 are provided with the same reference numerals. The local area network 120 may also include two servers 110A and 110B. Each server may include an optional display device 114A, 114B, respectively. In this example a third client, Client C, is illustrated having a display 152 and a client device 154. The wireless user device 150 is illustrated communicating through the Internet 148 and router 146 to the local area network 120. As mentioned above, the router 146 may directly communicate with the user device 150.

Figure 5:
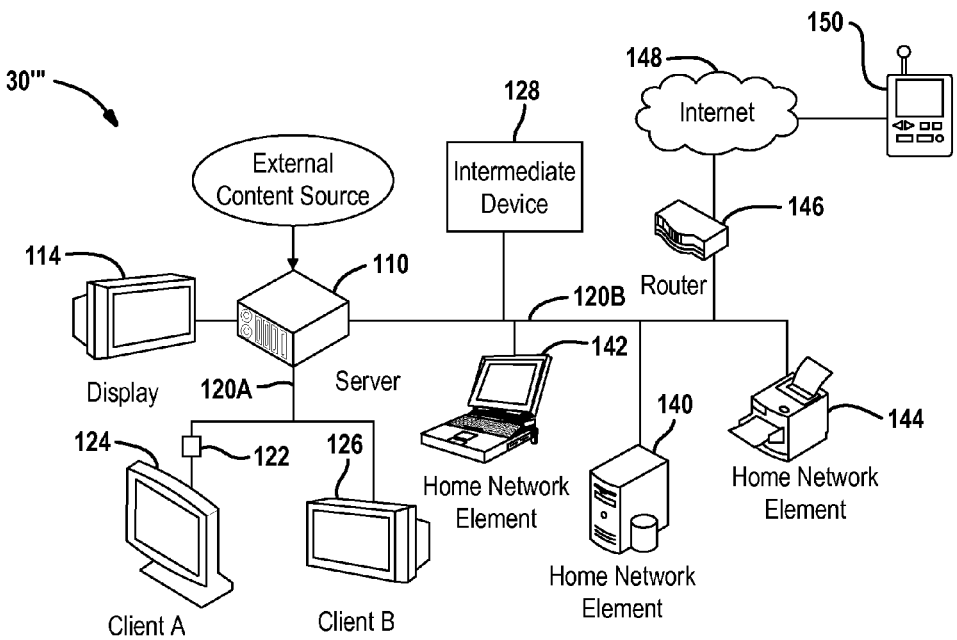
FIG. 5 is a block diagrammatic view of a fourth example of a network topology.

Referring now to FIG. 5, providing customers with reliable service is important. A fourth example of the fixed user system 30''' is illustrated. In certain cases, a home network may not be as reliable as a direct connection. In FIG. 5, the local area network is divided into a first local area network 120A between the first client, Client A, the second client, Client B, and the server 110. That is, the server 110 communicates through the first local area network 120A with both Client A and Client B and any other clients that may be on the system. A second local area network 120B may communicate with other devices within the home network such as the server 140, the laptop computer 142, the printer 144 and the router 146.

Figure 6:
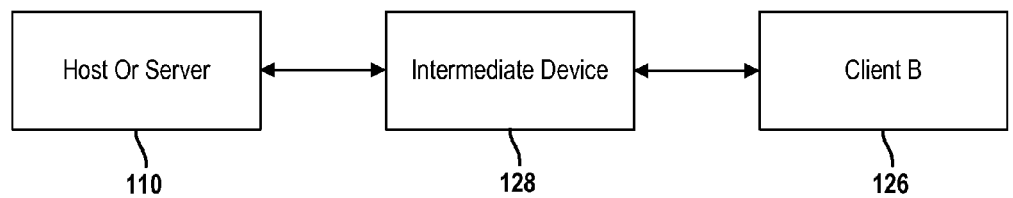
FIG. 6 is a block diagrammatic view of a fifth example of a network.

Referring now to FIG. 6, a simplified block diagrammatic view of an intermediate device 128 in communication with a host or server 110 and a client 126 is illustrated. In this example, client B 126 may be configured to transmit and receive signals using a second syntax different from the first syntax associated with the host or server. All signals passing between the host or server 110 and the client B may be communicated through the intermediate device 128 which acts as a syntax translator. The intermediate device 128 may provide video signals having graphics superimposed thereon for display by the client B. Interaction signals, such as command signals, may be communicated from the client B and translated to the first syntax by the intermediate device 128.

Figure 7:
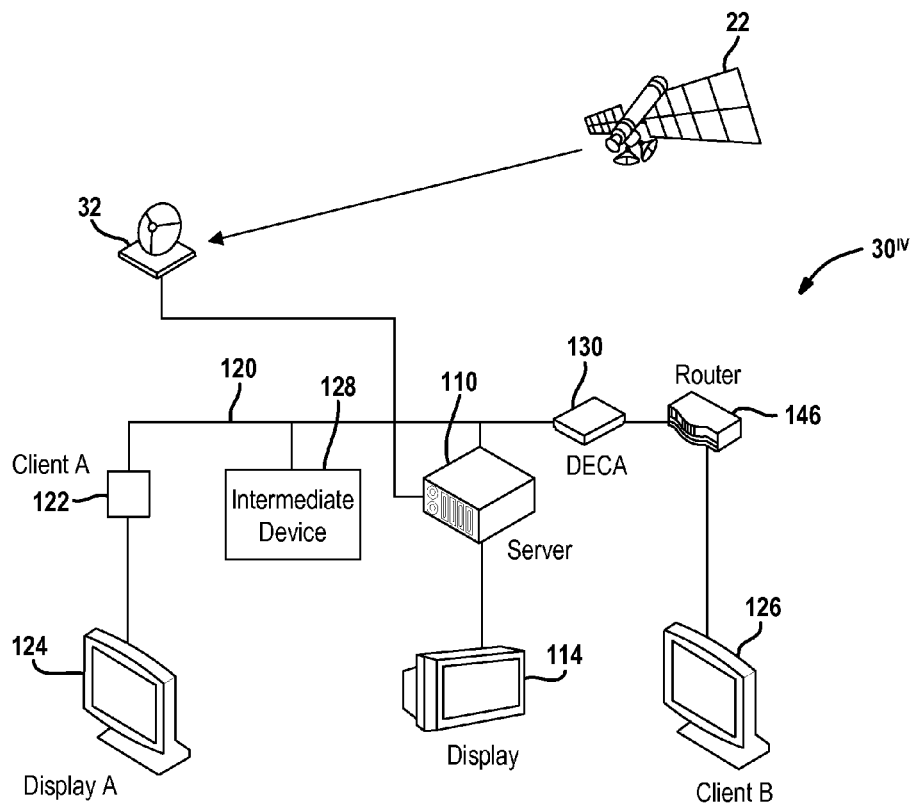
FIG. 7 is a block diagrammatic view of a sixth example of a network.

Referring now to FIG. 7, a user system $30^{IV}$ is set forth having an intermediate device 128 that acts as a bridge device that allows a first syntax server 110 to communicate with a second syntax client 126. In one example, the server communicates using RVU commands and the client 126 receives HTML commands.

A DIRECTV® Ethernet coaxial adapter (DECA) 130 is illustrated. The adapter 130 allows signals within a coaxial cable to be in connection with an Ethernet network connection. In this example, the client 126 may be in communication with the router 146 which, in turn, is in communication with the adapter 130. Thus, the client 126 may be adapted to receive Ethernet signals.

Figure 8:
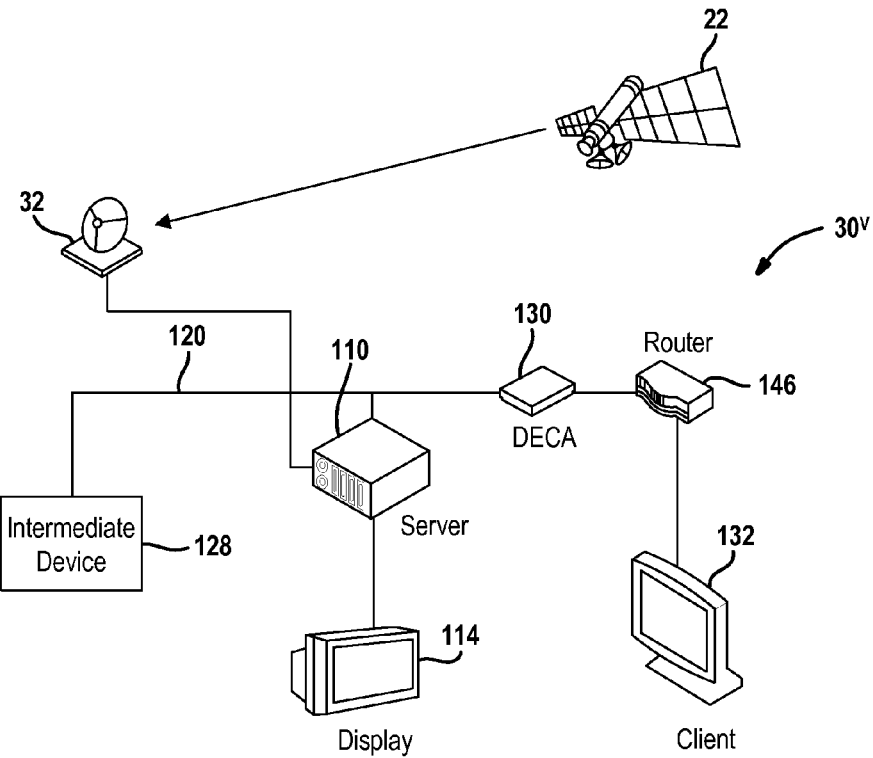
FIG. 8 is a block diagrammatic view of a seventh example of a network topology.

Referring now to FIG. 8, in another system, the server 110 uses a first syntax to communicate various command signals and content signals while a non-first syntax client 132 is in communication with the router 146. The intermediate device 128 acts as a bridge device that allows the non-first syntax client 132 to communicate with the server 110 by converting the command signals therebetween. The adapter 130 is also in communication between the server 110 and the non-first syntax client 132.

Figure 9:
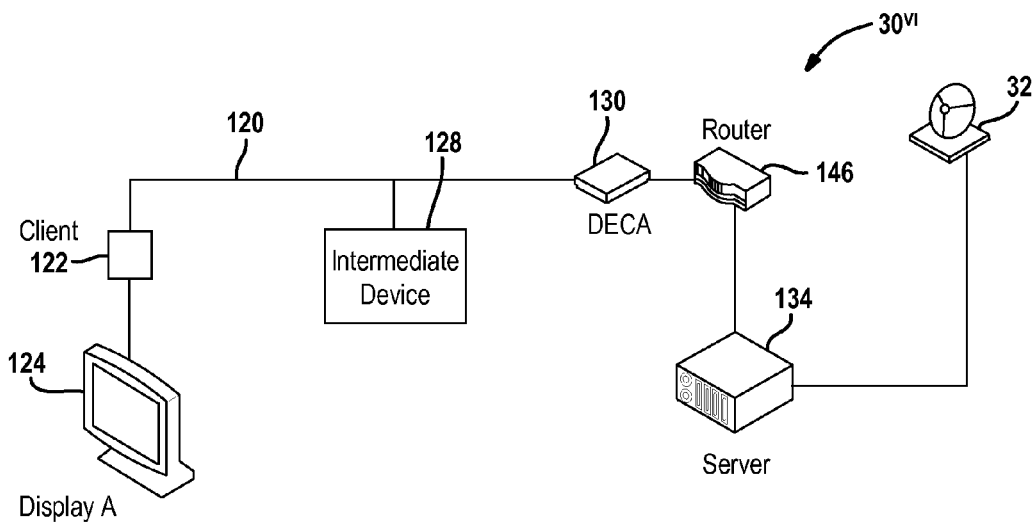
FIG. 9 is an eighth example of a network topology.

Referring now to FIG. 9, another user system $30^{VI}$ is illustrated. In this example, a first syntax server 134 is in communication with a second syntax client device 122 using the intermediate device 128 to communicate therebetween. The intermediate device 128, in this case, performs the operation of converting non-first (second) format graphics commands to the first syntax user interface graphic commands that are understood by the client device 122. The intermediate device 128 may also convert audio and video data into a suitable format for use by the client device 122.

Figure 10:
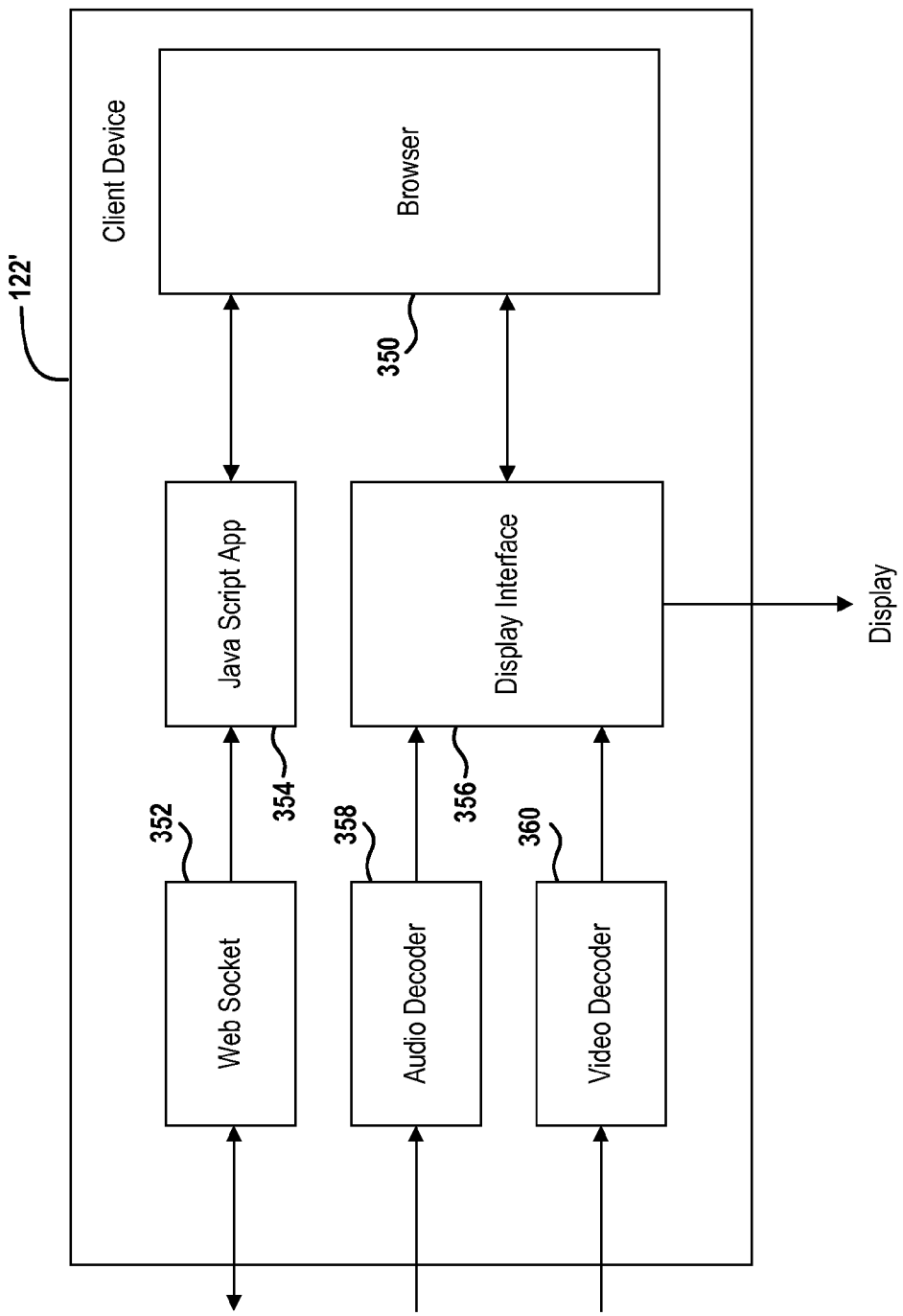
FIG. 10 is a block diagrammatic view of a client device.

Referring now to FIG. 10, a client device 122' is illustrated. The client device 122 may be a browser-based device having a browser 350. The browser 350, in this example, is a HTML5 type browser. Of course, other browser types may be used. In this example, the browser 350 runs a JAVASCRIPT® application 354. The JAVASCRIPT® application 354 uses an application interface such as WebSockets 352 to communicate with the intermediate device on the network. WebSockets provides bidirectional full-duplex communications over a single Transmission Control Protocol (TCP). WebSockets is used as an example of an interface. Another communication interface can be used in lieu of WebSockets. The JAVASCRIPT® application 354 may receive graphic commands that ultimately originate from the server or host device and are passed through the intermediate device. The graphic commands allow the web browser 352 to render a graphics image such as but not limited to a background, grid guide and overlays. Multiple graphic commands may be used to form various portions of the screen display through the display interface 356.

The user device 122 may also include an audio decoder 358 and a video decoder 360. The audio decoder 358 and the video decoder 360 may decode multiple formats of signals received through the network. AC3 audio decoding and MPEG decoding are examples for the audio decoder 358 and the video decoder 360, respectively.

Figure 11A:
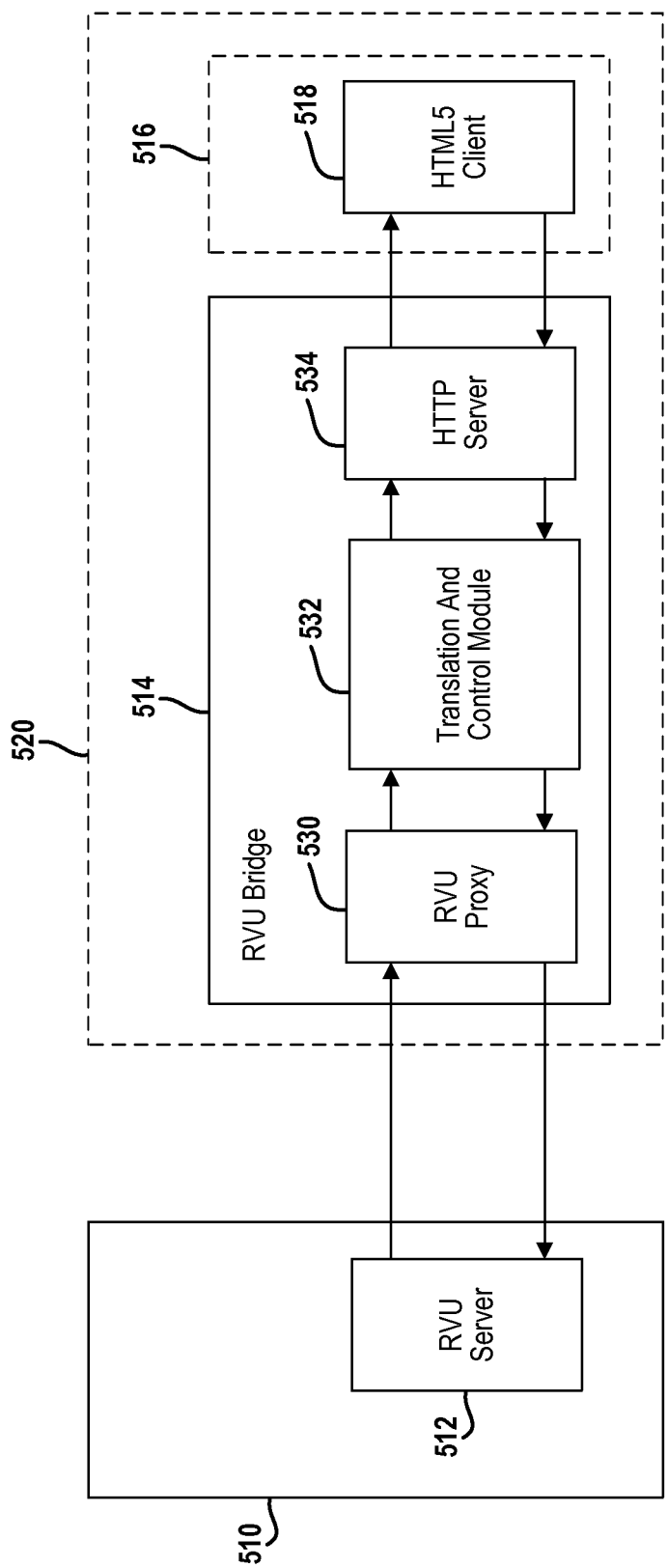
FIG. 11A is a block diagrammatic view of an intermediate device together with a simplified server.

Referring now to FIG. 11A, one example of a system that uses RVU protocol is set forth. The system includes a server 510 having an RVU server 512. The system also includes an intermediate device 514 that communicates between the RVU server 512 of the server device 510 and a client device 516. The client device 516 may have an HTML client 518. The dotted box 520 represents that the intermediate device 514 and the HTML client 518 may all be included within the client device 520 rather than separate devices.

The RVU server 512 is in communication with an RVU proxy 530 of the intermediate device 514. The RVU server 512, for example, communicates RVU graphics data and RVU commands such as an RVU write command. The RVU proxy 530 may communicate RVU responses from the intermediate device 514 or client device 516 to the RVU server 512.

The intermediate device 514 may also include a translation and control module 532 which is used to change the syntax of the server to the syntax of the client and vice versa. The translation and control module 531 performs the actual translation of the signal between the RVU format and the HTTP format. An example of the steps performed by the translation control module 532 is further described below in FIGS. 12-15. The bridge device 514 may also include an HTTP server 534. The HTTP server communicates HTML signals, JAVASCRIPT® signals, JSON signals and portable network graphics (PNG) signals to the HTML client 518. JAVASCRIPT® object notation (JSON) commands may also be communicated from the HTTP server 534 to the HTML client 518. The HTTP server 534 communicates JSON commands to the HTML client 518.

The HTML client 518 communicates JSON responses to the server. Also, HTTP GET commands may also be communicated from the HTML client 518 to the HTTP server.

The translation and control module 532 translates the syntax of RVU signals from the RVU server 512 into a format such as JSON format communicated by the HTTP server 534 to the HTML client 518. Raw graphics data may also be converted into PNG graphics signals by the translation and control module 532. One example of syntax translation of an RVU command into a JSON command is the RVU allocate buffer command signal: "<AllocateBuffer commandToken="1" width="200" height="300" pixelFormat="ARGB-32" color="0"/>". The corresponding JSON command signal is: "{"type":"RVU", "xmlTag":"AllocateBuffer", "xmlToken": "1", "xmlAttributes":{"width":"200", "height":"300", "pixelFormat":"ARGB-32", "color":"0"}}."

An example of syntax translation between a JSON response signal from the client 518 to the server 512 in the translation and control module 532 is: "{"xmlTag":"RvuResponse", "xmlToken":"1", "xmlAttributes": {}, "xmlStatus":"Okay"}." The translated RVU response is "<Response commandToken="1" errCode="ERR_SUCCESS"/>."

The translation and control module 532 is also used to perform image conversion on write image data. This allows improved performance of the JAVASCRIPT® application. The RVU write commands are issued by the RVU server along with the associated image pixel data. The translation and control module 532 compresses the image pixel data into a PNG file accessible through the HTTP server 534. The translation and control module 532 translates the RVU write command into a JSON write command with an additional field such as "binUrl" to indicate the location of the PNG file on the HTTP server 534. The HTTP client 518 receives JSON write commands from the intermediate device 514 and uses the "binUrl" field to retrieve the PNG with a standard HTTP get signal from the HTTP server 534. The HTTP client 518 then responds to the intermediate device 514 with a standard JSON response. Details of the processing within the intermediate device 514 are further described below.

Figure 11B:
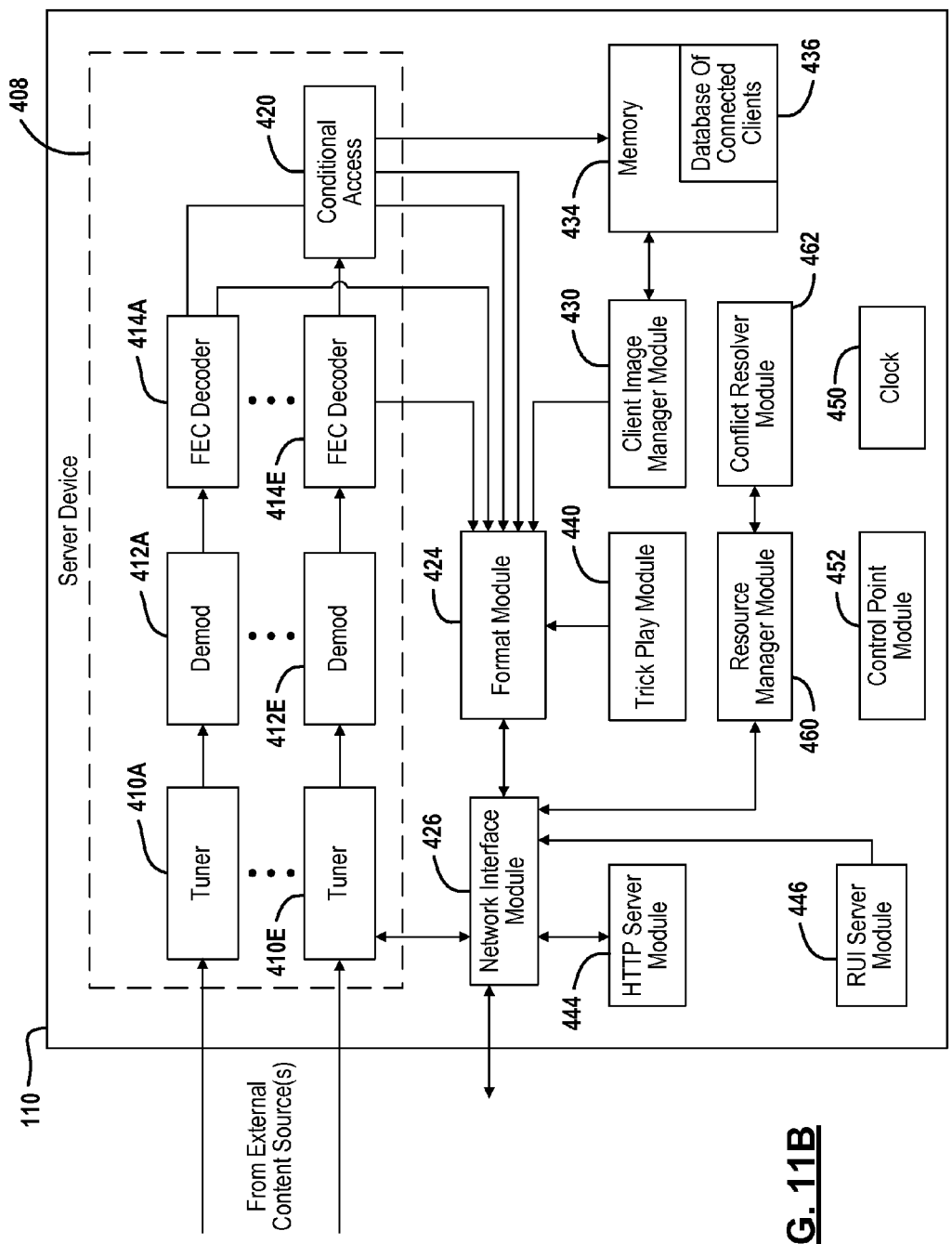
FIG. 11B is a second example of an intermediate device.

Referring now to FIG. 11B, a server 110 is illustrated in further detail. The server 110 is used for communicating with various client devices 122. The server 110, as mentioned above, may also be used for communicating directly with a display. The server 110 may be a standalone device or may be provided within another device. For example, the server 110 may be provided within or incorporated with a standard set top box. The server 110 may also be included within a video gaming system, a computer, or other type of workable device. The functional blocks provided below may vary depending on the system and the desired requirements for the system.

The server device 110 may be several different types of devices. The server device 110 may act as a set top box for various types of signals such as satellite signals or cable television signals. The server device 110 may also be part of a video gaming system. Thus, not all of the components are required for the server device set forth below. As mentioned above, the server device 110 may be in communication with various external content sources such as satellite television, cable television, the Internet or other types of data sources. A front end 408 may be provided for processing signals, if required. When in communication with television sources, the front end 408 of the server device may include a plurality of tuners 410A-E, a plurality of demodulators 412A-E, a plurality of forward error correction decoders 414A-E and any buffers associated therewith. The front end 408 of the server device 110 may thus be used to tune and demodulate various channels for providing live or recorded television ultimately to the client device 122. A conditional access module 420 may also be provided. The conditional access module 420 may allow the device to properly decode signals and prevent unauthorized reception of the signals.

A format module 424 may be in communication with a network interface module 426. The format module may receive the decoded signals from the decoder 414 or the conditional access module 420, if available, and format the signals so that they may be rendered after transmission through the local area network through the network interface module 426 to the client device. The format module 424 may generate a signal capable of being used as a bitmap or other types of renderable signals. Essentially, the format module 424 may generate commands to control pixels at different locations of the display. The network interface module 426 may also be used for receiving signals from a client device or devices.

The server device 110 may also be used for other functions including managing the software images for the client. A client image manager module 430 may be used to keep track of the various devices that are attached to the local area network or attached directly to the server device. The client image manager module 430 may keep track of the software major and minor revisions. The client image manager module 430 may be a database of the software images and their status of update.

A memory 434 may also be incorporated into the server device 110. The memory 434 may be various types of memory or a combination of different types of memory. These may include, but are not limited to, a hard drive, flash memory, ROM, RAM, keep-alive memory, and the like.

The memory 434 may contain various data such as the client image manager database described above with respect to the client image manager module 430. The memory may also contain other data such as a database of connected clients 436. The database of connected clients may also include the client image manager module data.

A trick play module 440 may also be included within the server device 110. The trick play module 440 may allow the server device 110 to provide renderable formatted signals from the format module 424 in a format to allow trick play signals such as rewinding, forwarding, skipping, and the like. An HTTP server module 444 may also be in communication with the network interface module 426. The HTTP server module 444 may allow the server device 110 to communicate with the local area network. Also, the HTTP server module may also allow the server device to communicate with external networks such as the Internet.

A remote user interface (RUI) server module 446 may control the remote user interfaces that are provided from the server device 110 to the client device 122.

A clock 450 may also be incorporated within the server device 110. The clock 450 may be used to time and control the various communications with the various client devices 122.

A control point module 452 may be used to control and supervise the various functions provided above within the server device.

It should be noted that multiple tuners and associated circuitry may be provided. The server device 110 may support multiple client devices 122 within the local area network. Each device is capable of receiving a different channel or data stream. Each client device may be controlled by the server device to receive a different renderable content signal.

The server device 110 may also include a resource manager module 460 that is in communication with a conflict resolver module 462. The resource manager module 460 may be in communication with a network interface module 426. The network interface module 426 may receive signals such as control signals or selection signals from various client devices. The resource manager module 460 may identify when a conflict arises from a conflict-causing request received from one of the client devices.

A conflict may arise when a concurrent view or service activity requires more resources than those available at the server device.

As will be further described below, the resource manager module 460 may generate a set of "sufficient sets." The sufficient sets may be provided to the conflict resolver module 462. The resource manager module 460 or the conflict resolver module 462 may then determine a course of action to follow for the encountered conflict. The conflict resolver module 462 may consider the type of activity generating the conflict-causing request versus the activities in the set of sufficient sets. The conflict resolver module 462 returns sufficient sets sorted according to the requirements of the system. The resource manager module 460 may thus resolve the conflict according to the sufficient sets and prompt the user of a client device for an input, if required. The conflict resolver module 462 may resolve conflicts between various aspects of the operation of the server, including tuner conflicts as will be described below.

Figure 12:
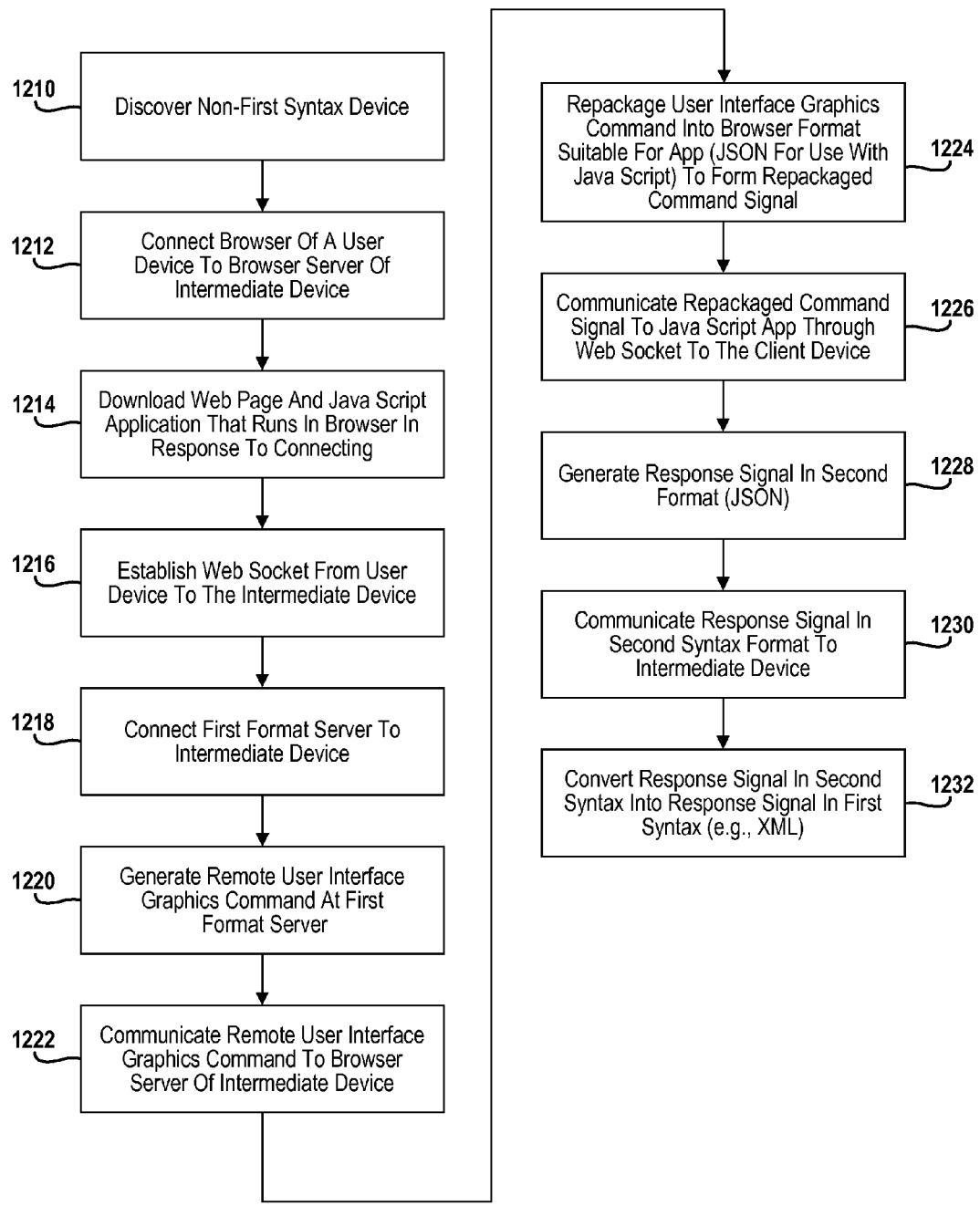
FIG. 12 is a flowchart of a method for communicating between a first format device and a non-first format device.

Referring now to FIG. 12, a method of communicating between a first syntax device and a second syntax device is set forth. Syntax refers to the command format used by the device. In step 1210, the second or non-first syntax device is discovered by the intermediate device. The intermediate device may poll the network for new devices or the non-first syntax device may generate an announcement signal. In step 1212, a browser of a user device is connected to a browser of a server that is within the intermediate device. In step 1214, a web page and JAVASCRIPT® application that runs in the browser is downloaded in response to connecting. In step 1216, a WebSocket is established from the user device to the intermediate device. In step 1218, the first format server is connected to the intermediate device for communication therebetween.

In step 1220, a remote user interface graphics command is generated at the first format server. Various types of graphics commands may be used and are not limited to grid guides, overlays, background images, menus queries and confirmations. In step 1222, the remote user interface graphics command is communicated to the intermediate device. In step

1224, the user interface graphics command is repackaged into a second graphics command which is in a browser syntax suitable for the application. In the present example, the translation and control module 532 is used to convert the user interface graphics command syntax into a second graphics command syntax. In the present example, the second syntax is JAVASCRIPT® object notation (JSON). Of course, a different encapsulation other than JSON may be used. Step 1224 generates a repackaged or second graphicscommand signal in a different syntax.

In step 1226, the repackaged (JSON is the syntax in this example) command signal is communicated to the JAVASCRIPT® application through the WebSocket. In step 1228, a response signal in the second syntax is generated. In step 1230, the response signal in a second syntax is communicated to the intermediate device to the client device. In step 1232, the intermediate device converts the response signal in the second syntax into a response signal in the first syntax. In the present example, XML response signals may be formed from the signal in the second syntax.

It should be noted that the intermediate device may work with various types of browsers. A HTML5 browser supporting WebSocket may also transfer binary data as well as text data. Early versions of HTML5 browser may only support text data through WebSocket. One example of converting commands is to convert all commands into text data for communication from the intermediate device. Binary graphics data may be converted into text using Base64 encoding for communication through the WebSocket. The JAVASCRIPT® application may Base64 decode the text back into binary for use in the browser. It should be noted that compression may also be used to reduce the data for transfer on the binary data before transmitting the data to the JAVASCRIPT® application.

An example of a compression scheme compresses the raw data from the server or host at the intermediate device into PNG. Typical HTML browsers natively support PNG format. A uniform resource locator (URL) linking the PNG data may be sent through the WebSocket where the JAVASCRIPT® application can retrieve the PNG data using the HTTP Get command outside of the WebSocket connection.

It should also be noted that the intermediate device may pass XML based commands such as RVU directly to the JAVASCRIPT® application without modification. The JAVASCRIPT® application, therefore, would parse or generate XML-based commands or responses directly.

Older browsers without WebSockets may also work with the intermediate device. A technique such as COMET or long-polling can be used by the JAVASCRIPT® application to communicate with the intermediate device.

The intermediate device may also provide additional functionalities above the command translation functions. The intermediate device may emulate two or more client devices and provide a single user interface to the browser. The intermediate device may take the two content streams and synthesize a single user interface to form functionality such as picture-in-picture. The intermediate device may also connect to two different server devices within a single network or different networks. The intermediate device may combine content with the original content provided by the RVU server such as the addition of an advertisement graphics banner.

The intermediate device may also provide authentication. Access by a client device to an intermediate device may be controlled by a local administrator imposing authentication at the intermediate device.

In the manner set forth, in FIG. 12, a browser type device using a browser that supports HTML5 may communicate with a server device such as an RVU server, the reverse is also possible where an RVU only client can provide HTML browsing functionality through the RVU server and an intermediate device. An RVU server containing an HTML browser can provide RVU clients HTML browsing capabilities. Instead of rendering to the RVU server's display, the rendering may be done onto the RVU client's output display using RVU commands. Similarly, the RVU client's user inputs are sent to the RVU server as RVU commands and the key presses translate to HTML rendering inputs on the RVU server.

Figure 13:
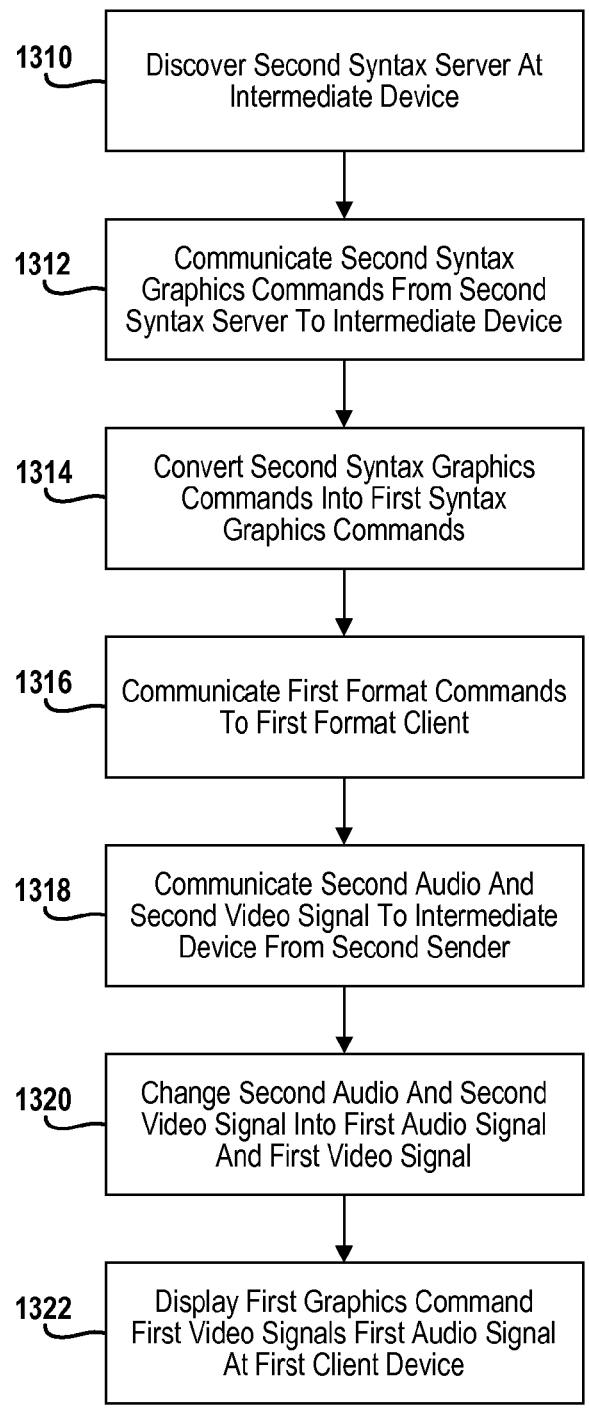
FIG. 13 is a flowchart of a method for communicating graphics commands between two devices.

Referring now to FIG. 13, a method of displaying graphics commands are set forth. In step 1310, a second syntax server is discovered at the intermediate device. It should be noted that an announcement signal may be communicated from the second server for discovery. The intermediate device may also prompt or initiate a response generating a query signal.

In step 1320, a second syntax graphics command is communicated from a second syntax server to an intermediate device. The second syntax server may be an HTML5 server or another type of server. In step 1314, the intermediate device converts the second syntax graphics commands into first syntax graphics commands. In step 1316, the first format commands are communicated to a first syntax client. The first syntax client may be an RVU client. In step 1318, the second syntax audio and second syntax video signals are also communicated to the intermediate device from the second syntax server. In step 1320, the second syntax audio and second syntax video signals are communicated into a first syntax audio signal and a first syntax video signal. In step 1322, the first syntax graphics command, the first syntax video signals and the first syntax audio signal are displayed at the first syntax client device. The graphics commands may include binary graphics commands.

Figure 14:
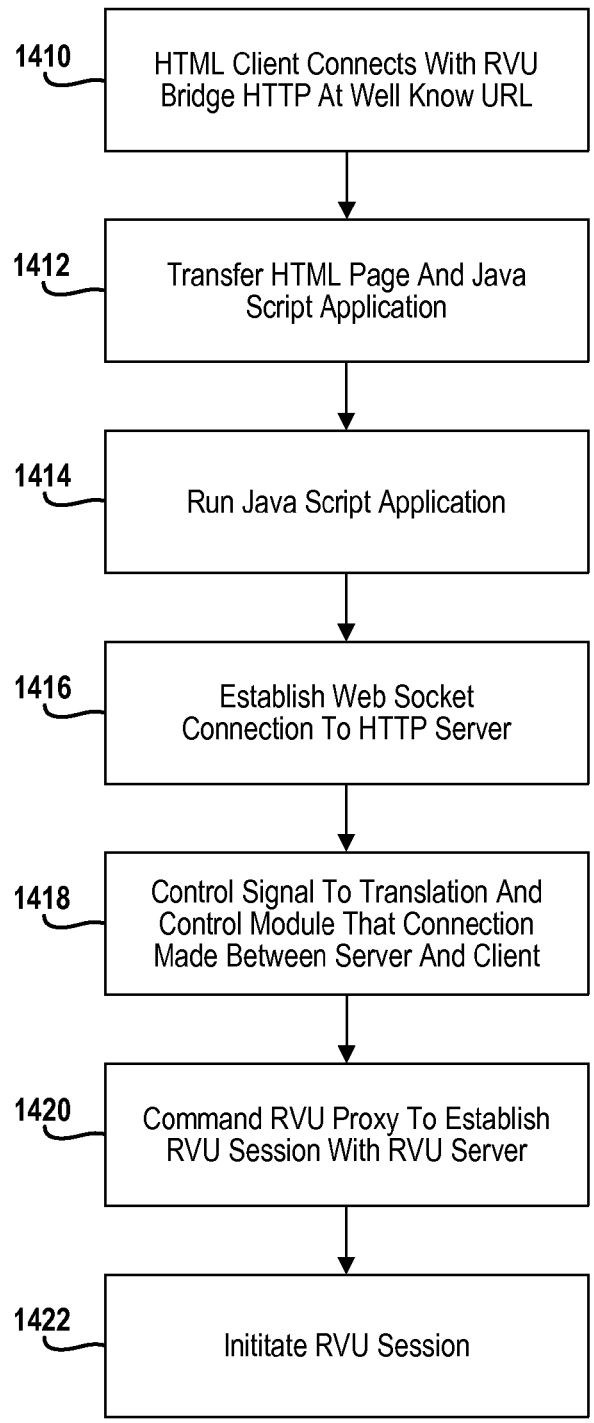
FIG. 14 is a flowchart of a method for initiating a session between an RVU bridge and an HTML client.

Referring now to FIG. 14, the initial establishment of a session is set forth. In step 1410, the HTML client of the client device connects with the HTTP server contained within the intermediate device at a well-known or mutually known URL. The URL may be a predetermined uniform resource locator. The URL could also be autodetected through some mechanism such as the Simple Service Discovery Protocol (SSDP). In step 1412, an HTML page is transferred to the client device along with a JAVASCRIPT® application. In step 1414, the JAVASCRIPT® application is run by the HTML client. In step 1416, a WebSocket connection from the HTML client to the intermediate device is established in response to running the application. In step 1418, a control signal is communicated from the HTTP server to the translation and control module to notify the RVU proxy that a connection between the HTTP server and HTML client has been established. The translation and control module commands the RVU proxy to establish an RVU session with the RVU server in step 1420.

In step 1422, the RVU proxy initiates an RVU session with the RVU server of the server device.

Figure 15:
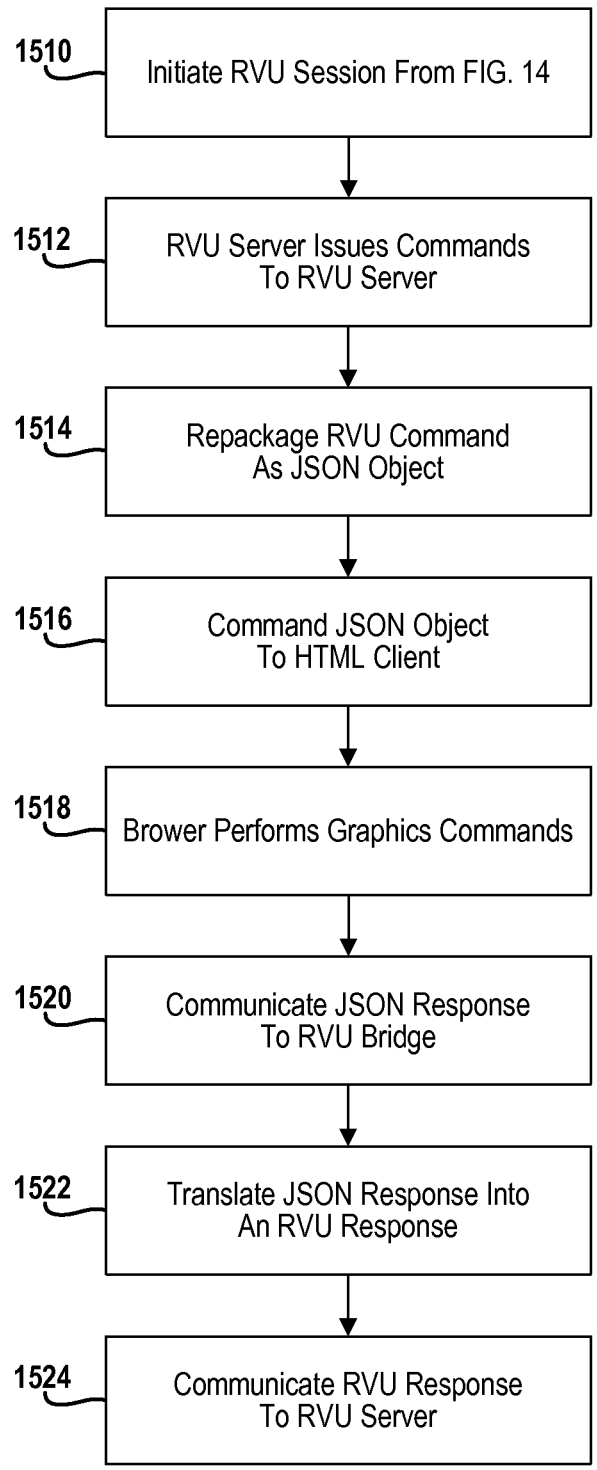
FIG. 15 is a flowchart of a method for communicating between an RVU bridge, a client device and a server device.

Referring now to FIG. 15, the operation of the system illustrated in FIG. 11A is described in further detail. In step 1510, the RVU session is initiated from FIG. 14. In step 1512, the RVU server in the server device issues RVU commands to the RVU bridge. In step 1514, the RVU bridge repackages the RVU commands as a JSON object. In step 1516, the JSON object is communicated to the HTML client which may be a browser. In step 1518, the browser performs the graphics commands specified in the JSON object. An application interface within the browser is used to perform the command. In step 1520, a JSON response is communicated to the RVU bridge and, more specifically, to the HTTP server of the RVU bridge. In step 1522, the translation and control module of the RVU bridge translates the JSON response into an RVU response. In step 1524, the RVU bridge through the RVU proxy sends the RVU response to the RVU server.

User events can also be issued from the user device to the server device. For example, a user presses a key button in the HTML client. The java script application will take the key event and package that into a JSON object. The java script application will communicate the JSON object to the RVU bridge. The RVU bridge will convert the JSON object to an RVU command representing a user key event. The RVU command is then communicated to the RVU server.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
    a client device having a first syntax type associated therewith, said client device comprising a first browser;
    an intermediate device comprising a first server with a second browser in communication with the first browser, a translation and control module and a proxy;
    said first server communicating an application that operates in the first browser, said application establishes a WebSocket connection to the intermediate device; and
    a second server having RVU type associated therewith, said second server in communication with the proxy;
    said second server communicating RVU command to the intermediate device;
    said intermediate device converting the RVU command to a first syntax command in response to the first syntax type in the translation and control module;
    said client device processes the first syntax command after receiving the first syntax command from the intermediate device.

2. The system as recited in claim 1 wherein the client device comprises a user device, wherein the first syntax command and the RVU command comprises a first graphics command and a second graphics command and the user device generates a screen display in response to the first graphics command.

3. The system as recited in claim 2 wherein said first graphics command is readable by the application.

4. The system as recited in claim 1 wherein the application comprises a JAVASCRIPT® application.

5. The system as recited in claim 3 wherein the first graphics command comprises a JAVASCRIPT® object notation (JSON) command.

6. The system as recited in claim 3 wherein the first server comprises an HTTP server and the first browser comprises an HTML browser.

7. The system as recited in claim 3 wherein the client device generates a response signal from the first browser and communicates the response signal to the first server of the intermediate device.

8. The system as recited in claim 1 wherein the intermediate device converts the first syntax command to the RVU command using one of base64, PNG or JPG encoding.

9. The system as recited in claim 1 wherein the client device comprises a user device, the first syntax command and RVU command comprises user event commands and the second server processes the user event commands.

10. The system as recited in claim 9 wherein the user device generates a JAVASCRIPT® object notation (JSON) user command and communicates the JSON user command to the intermediate device, said intermediate device converting the JSON user command to an XML user command, said intermediate device communicating the XML user command to the second server.

11. The system as recited in claim 9 wherein the application comprises a JAVASCRIPT® application that receives HTML browser user events, converts the HTML browser user events into JSON user commands, and communicates the JSON user commands to the intermediate device.

12. A method comprising:
    communicating a first syntax type signal from a client device to an intermediate device, said client device comprising a first browser;
    communicating an application from a first server of the intermediate device that operates in the first browser;
    establishing a WebSocket connection to the first server from the application of the first browser;
    communicating RVU command from a second server device to a proxy of the intermediate device;
    converting the RVU command to a first syntax command in response to the first syntax type signal in a translation and control module of the intermediate device;
    communicating the first syntax command from the intermediate device to the client device; and processing the first syntax command at the client device.

13. The method as recited in claim 12 wherein the client device comprises a user device, wherein the first syntax command comprises a first graphics command and the RVU command comprise a second graphics command and the user device generates a screen display in response to the second graphics command.

14. The method as recited in claim 13 wherein converting comprises converting the second graphics command to a format readable by the application.

15. The method as recited in claim 14 further comprising generating a response signal from the first browser and communicating the response signal to the server of the intermediate device.

16. The method as recited in claim 13 wherein communicating the application comprises downloading an application using an HTML browser of the user device from an HTTP server of the intermediate device that establishes a WebSocket connection to the intermediate device, and wherein converting comprises converting the second graphics command to a format readable by the application.

17. The method as recited in claim 13 wherein converting the second graphics command to the first graphics command comprises converting the second graphics command to a binary graphics command.

18. The method as recited in claim 17 wherein converting comprises converting the second graphics command to the first graphics command comprising text using base64, PNG or JPG encoding.

19. The method as recited in claim 12 wherein the client device comprises a user device, the first syntax command comprises a first user event command.

20. The method as recited in claim 19 further comprising generating a JAVASCRIPT® object notation (JSON) user command from the user device, communicating the JSON user command from the user device to the intermediate device.

21. The method as recited in claim 20 wherein the application comprises a JAVASCRIPT® application receiving HTML browser user events, converting the HTML browser user events into JSON user commands, and communicating the JSON user commands to the intermediate device.

* * * * *